United States Patent
Lovinggood et al.

(10) Patent No.: US 7,068,973 B1
(45) Date of Patent: Jun. 27, 2006

(54) METHOD AND APPARATUS FOR RETRANSMITTING RECEIVED SATELLITE SIGNALS INSIDE A STRUCTURE

(75) Inventors: Breck W. Lovinggood, Garland, TX (US); David T. Tennant, Flossmoor, IL (US)

(73) Assignee: Andrew Corporation, Westchester, IL (US)

( * ) Notice: Subject to any disclaimer, the term of this patent is extended or adjusted under 35 U.S.C. 154(b) by 0 days.

(21) Appl. No.: 09/513,543

(22) Filed: Feb. 25, 2000

(51) Int. Cl.
*H04B 7/15* (2006.01)
*H04B 7/185* (2006.01)

(52) U.S. Cl. .................. 455/11.1; 455/12.1; 455/131; 455/232.1

(58) Field of Classification Search ............ 455/7, 455/11.1, 12.1, 14, 232.1, 234.1, 427, 456, 455/571, 131, 142, 456.1, 20; 342/357.01, 342/357.02, 357.12, 357.06
See application file for complete search history.

(56) References Cited

U.S. PATENT DOCUMENTS

| | | | | |
|---|---|---|---|---|
| 4,972,346 A | * | 11/1990 | Kawano et al. ............ 455/571 |
| 5,628,049 A | * | 5/1997 | Suemitsu .................. 455/11.1 |
| 5,825,327 A |   | 10/1998 | Krasner .................... 342/357 |
| 5,831,574 A |   | 11/1998 | Krasner .................... 342/357 |
| 5,937,332 A | * | 8/1999 | Karabinis ................. 455/12.1 |
| 6,052,558 A | * | 4/2000 | Cook et al. ............... 455/12.1 |
| 6,134,437 A | * | 10/2000 | Karabinis et al. .......... 455/427 |

FOREIGN PATENT DOCUMENTS

EP    0559557 A1 *  9/1993

OTHER PUBLICATIONS

"An Introduction to SnapTrack™ Server-Aided GPS Technology" (11 pages); source: www.snaptrackinc.com.

* cited by examiner

*Primary Examiner*—Quochien B. Vuong
(74) *Attorney, Agent, or Firm*—Wood, Herron & Evans, LLP

(57) ABSTRACT

The present invention provides a method of retransmitting a GPS signal inside a structure. The method includes receiving the GPS signal, amplifying the GPS signal to produce a second GPS signal, and retransmitting the second GPS signal inside the structure either directly or indirectly through an intermediate link in one of the unlicensed bands. The present invention may also be used for the retransmission of digital radio signals inside a structure.

21 Claims, 4 Drawing Sheets

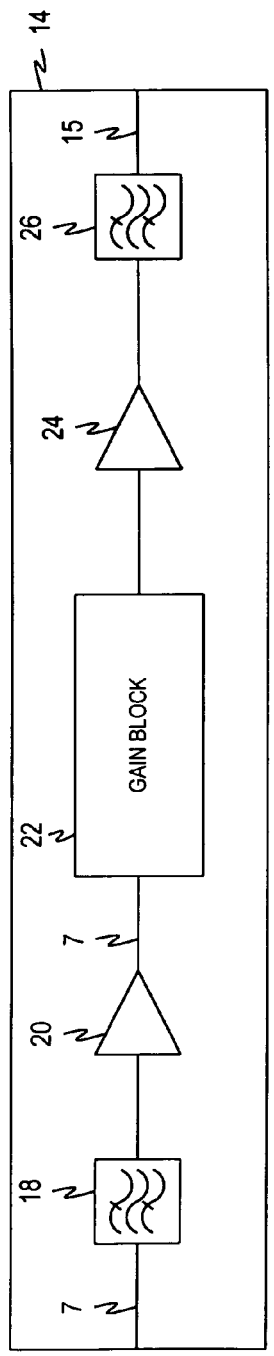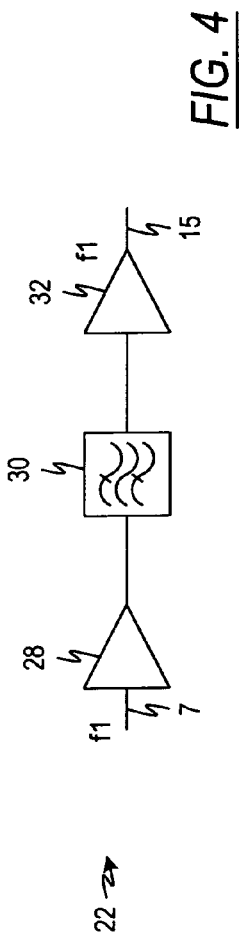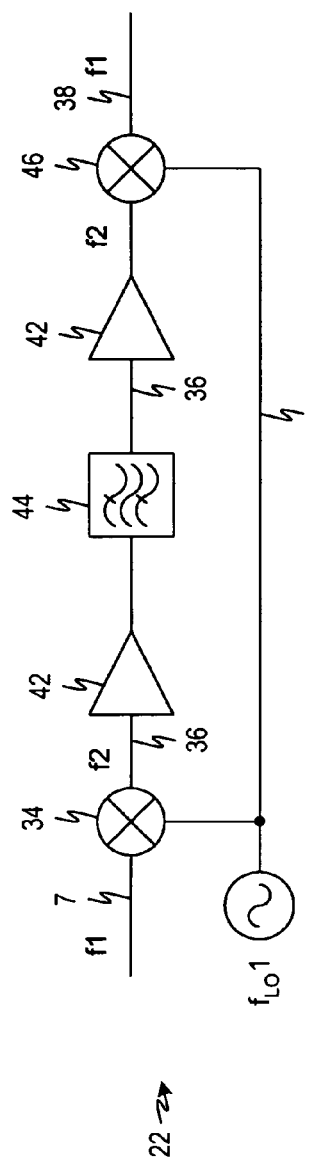
FIG. 3
FIG. 4
FIG. 5

METHOD AND APPARATUS FOR RETRANSMITTING RECEIVED SATELLITE SIGNALS INSIDE A STRUCTURE

FIELD OF THE INVENTION

The present invention relates generally to repeaters. More particularly, it concerns a repeater system for retransmitting received satellite signals such as GPS signals inside a structure.

BACKGROUND OF THE INVENTION

Repeater systems are typically used to extend the range of a radio frequency communications signal and to fill nulls in the intended coverage area of the transmitting antenna. Nulls are regions that are blocked from receiving radio frequency (RF) signals. Nulls are caused by hills, trees, structures, buildings, etc.

A typical repeater system comprises three basic parts: a link antenna which is directed/aimed at the transmitting antenna; repeater electronics; and a broadcast antenna which is directed towards the area of interest. Often, the link antenna is highly directive (high gain) with a very narrow beamwidth since it only needs to "see" the transmitting antenna. The broadcast antenna has a larger beamwidth which is determined by the intended area to be covered. The repeater electronics may contain an assortment of filters, splitters, and RF amplifiers.

Two primary performance factors for coverage on which an antenna system is based are gain and output power. The output power is primarily determined by the sum of the link and broadcast antenna gains and the maximum (linear) output power of the amplifier(s). The system gain is determined by the sum of the passive antenna gains, plus the gain of the amplifier(s). This is limited by the isolation (or mutual coupling) between the broadcast and link antennas. The isolation depends on the antenna type, front to back (F/B) ratio, beamwidth and antenna placement/separation.

Repeater systems are used in a variety of applications such as TV and radio transmission, cellular/PCS communications, and positioning systems. Existing positioning systems, such as the Global Positioning System (GPS), use transmitting antennas mounted on satellites. The GPS antennas require a clear line-of-sight between them and their receivers. In other words, a GPS receiving antenna must have an unobstructed view of the sky such that a minimum number of GPS satellites are always in view at any particular time. Consequently, accurately determining the position of a GPS receiver requires the GPS receiving antenna to be in the line-of-sight of these GPS transmitting antennas at all times. Therefore, when a person with a GPS receiver enters a structure such as a building, a car garage, a tunnel, etc., the GPS signal is lost. This is a particularly troublesome problem in light of a new FCC mandate.

Specifically, the FCC has mandated that wireless communications systems (e.g., cellular and PCS) must provide Enhanced 911 service. This mandate requires that persons making wireless 911 calls be located to within 125 meters of their actual location. The mandate also requires locating such persons with a 67% reliability. Currently, a commercial version of the GPS is being considered as an approach to providing the required location information. The commercial GPS being considered uses the Standard Positioning System (SPS). The SPS is 95% accurate in providing the location of a GPS receiver to within 100 meters horizontally and 156 meters vertically of the actual GPS receiver location.

However, a major deficiency with using the GPS for the mandated Enhanced 911 service is the inability of GPS receivers to determine location information when their antennas do not have a clear line-of-sight with the satellites. For example, GPS receivers are blocked from communicating with GPS satellites when the receivers are inside a structure such as a building, a car garage, a tunnel, etc. Since many wireless users spend a significant amount of time inside structures, this represents a major problem in trying to meet the 67% reliability requirement.

Therefore, there is a need for a repeater capable of retransmitting a GPS signal inside a structure such that an uninterrupted GPS signal can be transmitted to the GPS receiver. The present invention is directed to addressing this need.

SUMMARY OF THE INVENTION

The present invention provides a method of retransmitting a GPS signal or other received satellite signals inside a structure. The method includes receiving the satellite signal, amplifying the received signal to produce a second satellite signal, and retransmitting the second signal inside the structure.

BRIEF DESCRIPTION OF THE DRAWINGS

Other objects and advantages of the invention will become apparent upon reading the following detailed description and upon reference to the accompanying drawings, in which:

FIG. 3 is a block diagram of a primary GPS repeater used in the GPS repeater systems of FIGS. 1 and 2;

FIG. 4 is a block diagram of one embodiment of a gain block used in the primary GPS repeater of FIG. 3;

FIG. 5 is a block diagram of another embodiment of the gain block of FIG. 3;

Figures 1, 2:
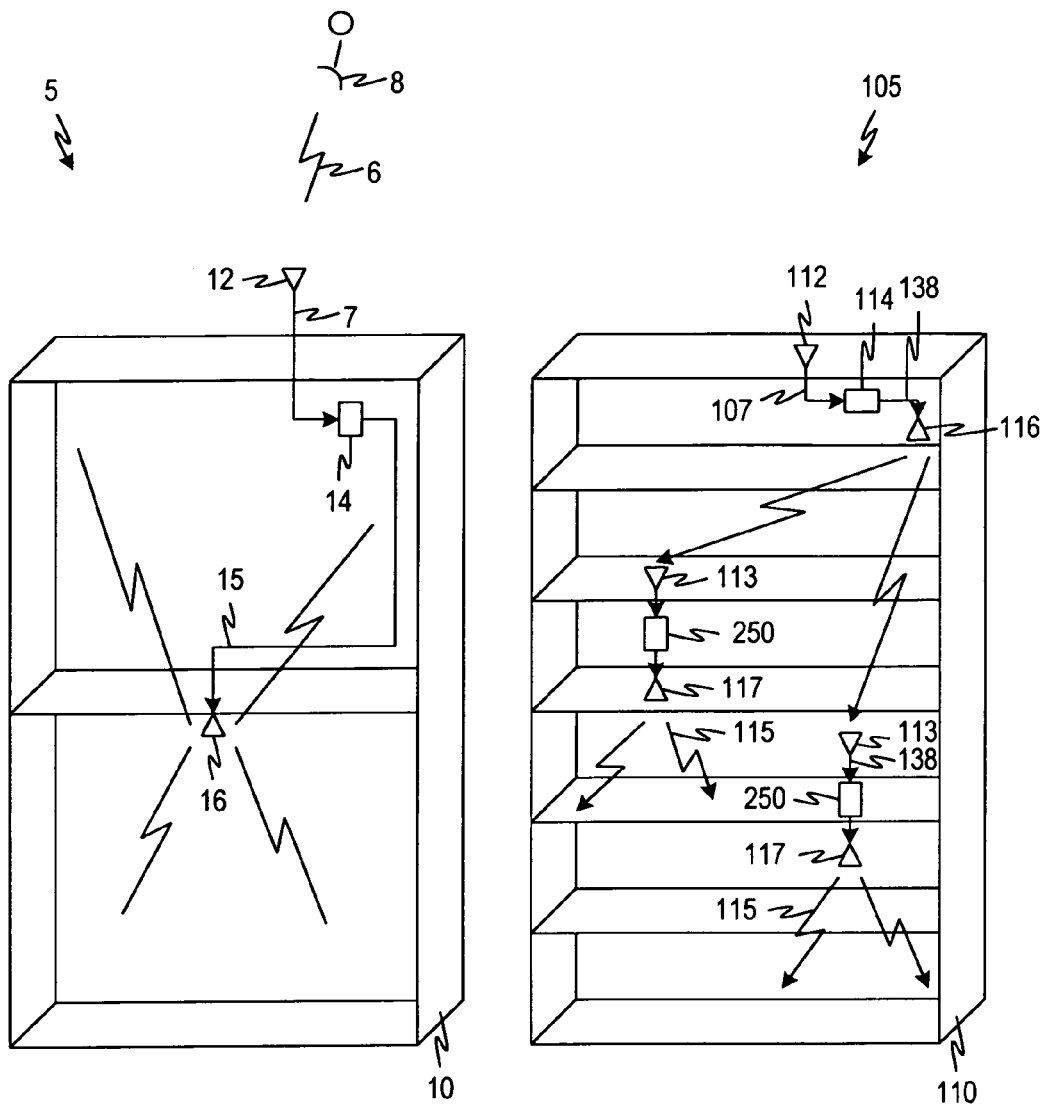
FIG. 1 is a structure that includes a GPS repeater system according to one embodiment of the invention.
FIG. 2 is another structure that includes a GPS repeater system according to another embodiment of the invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to FIG. 1, there is shown an antenna system 5 for retransmitting a GPS signal 6 inside a structure 10. The antenna system 5 includes a link antenna 12 for receiving the GPS signal 6 from a GPS transmitting antenna 8, a GPS repeater 14 for amplifying the received GPS signal 7 to produce a second GPS signal 15 and a broadcast antenna 16 for retransmitting the second GPS signal 15 inside the structure 10. This embodiment works best where the structure 10 has the dimensions of a two-story building.

The GPS repeater 14 feeds the received GPS signal 7 into the structure 10. In one embodiment, the external link antenna 12 captures the GPS signal 6 and feeds it to the GPS repeater 14. The GPS repeater 14 boosts the received GPS signal 7 and drives an internal broadcast antenna 16 that radiates the second GPS signal 15 inside the structure 10.

The present invention overcomes the inability of GPS receivers to work inside a structure, which is a major shortcoming of the Global Positioning System. As the GPS is used in more commercial applications, the ability to overcome this shortcoming becomes very important. Examples of commercial uses of the GPS include: Enhanced 911 service; wireless phone services that provide an Internet connection; wireless services that provide the location of, e.g., hotels, restaurants, and businesses; services that provide assistance to the elderly and handicapped; and locator services (provide by, e.g., rental car companies) that provide location information that can be received inside structures such as parking garages, buildings and tunnels.

In one embodiment, the GPS repeater 14 includes the components shown in FIG. 3. Those components include a band pass filter 18, a low noise amplifier 20, a gain block 22, a power amp 24 and second band pass filter 26. The band pass filters 18 and 26 are selected so as to reduce the out-of-band signals. For a GPS repeater system, the pass band will usually be around 1575.42 MHz (+/−500 kHz). In one embodiment, the gain block 22 includes a radio frequency (RF) amplifier 28, a band pass filter 30 and a second RF amplifier 32, as shown in FIG. 4.

In another embodiment shown in FIG. 5, the gain block 22 includes a mixer 34 for down converting the GPS signal 7 to an intermediate frequency (IF) signal 36. The GPS signal 7 is combined by a mixer 34 with a local oscillator (LO) signal 40 to produce the IF signal 36. In one embodiment, the IF is between about 140 MHz to 160 MHz, depending on the application. Thus, where the LO signal 40 is 1640 MHz and the GPS signal 7 is 1.5 GHz, then the IF signal would be 140 MHz. The IF signal 36 is amplified by amplifiers 42 and filtered by a band pass filter 44. The band pass filter 44 significantly reduces the complex components or images of the GPS signal 7 and the LO signal 40. A second mixer 46 converts the IF signal 36 to produce the RF signal 38. The IF signal 36 is combined by the second mixer 46 with the LO signal 40 to produce the RF signal 38. In one embodiment, the IF is between about 140 MHz to 160 MHz, depending on the application. Thus, where the LO signal 40 is 1640 MHz and the IF signal is 140 MHz, then the RF signal 38 is 1.5 GHz. Therefore, in this embodiment, the RF signal 38 is the second GPS signal 15.

In one embodiment, the RF signal 38 is an unlicensed frequency signal. The unlicensed frequency signal can be in any frequency range not licensed by the Federal Communications Commission (FCC). Some examples of unlicensed frequency bands include: 902–928 MHz and 2.4 GHz.

Referring to FIG. 2, there is shown an antenna system 105 for retransmitting a received GPS signal 107 inside a structure 110. The antenna system 105 includes a link antenna 112 for receiving the GPS signal 107, a primary GPS repeater 114 for amplifying the GPS signal 107 to produce an RF signal 138, a first broadcast antenna 116 to broadcast the RF signal 138 to one or more secondary repeaters 250 located to cover the intended coverage area inside the structure 110. The RF signal 138 is broadcast to the secondary repeater(s) 250 at either the original GPS frequency or another available frequency. In one embodiment, the RF signal 138 is in one of the unlicensed frequency bands such as the Instrumentation, Scientific and Medical (ISM) frequency band of 902 MHz–928 MHz. Each secondary repeater 250 receives the RF signal 138 via a link antenna 113, amplifies the RF signal 138 to produce a second GPS signal 115 and retransmits the second GPS signal 115 via a second broadcast antenna 117 inside the structure 110. The secondary repeater(s) 250 may be placed inside the structure 110 or even placed external to the structure 110 such that the RF signal 138 can be retransmitted into the structure through the windows or walls of the structure. This embodiment works best where the structure 110 has the dimensions of a multi-story building.

Figure 6:
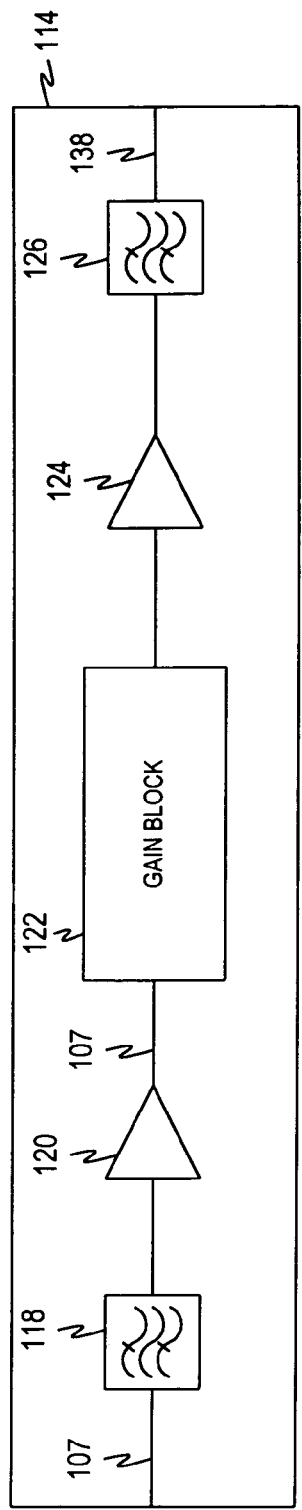
FIG. 6 is a block diagram of another primary GPS repeater used in the GPS repeater systems of FIGS. 1 and 2.
Figure 7:
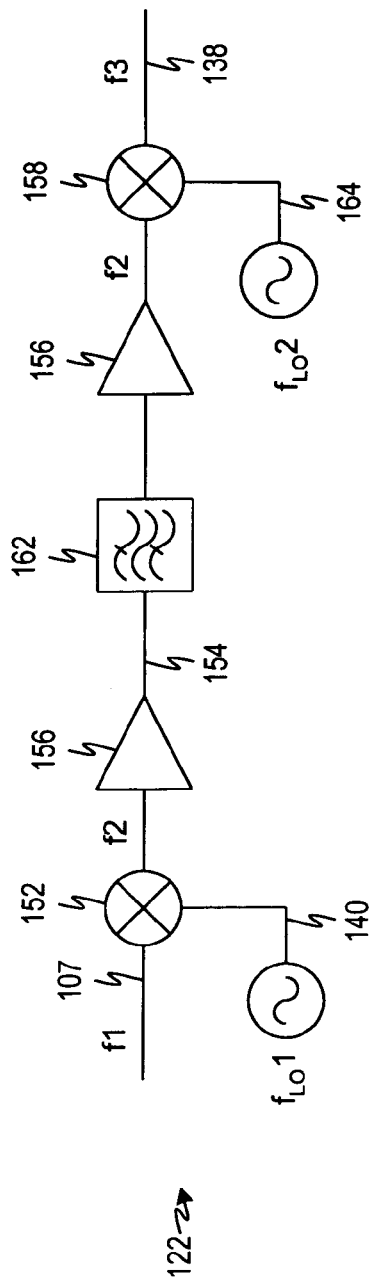
FIG. 7 is a block diagram of one embodiment of a gain block used in the primary GPS repeater of FIG. 6.

In one embodiment, the primary repeater 114 includes the components shown in FIG. 6. Those components include a band pass filter 1118, a low noise amplifier 120, a gain block 122, a power amp 124 and second band pass filter 126. In one embodiment, the gain block 122 includes, as shown in FIG. 7, a mixer 152 for down converting the GPS signal 107 to an IF signal 154. The GPS signal 107 is combined by a mixer 152 with a local oscillator (LO) signal 140 to produce the IF signal 154. In one embodiment, the IF is between about 140 MHz to 160 MHz, depending on the application. Thus, where the LO signal 140 is 1640 MHz and the GPS signal 107 is 1.5 GHz, then the IF signal would be 140 MHz. The IF signal 154 is amplified by amplifiers 156 and filtered by a band pass filter 162. The band pass filter 162 significantly reduces the complex components or images of the GPS signal 107 and the LO signal 140. A second mixer 158 up converts the IF signal 154 to produce the RF signal 138. The IF signal 154 is combined by the second mixer 158 with a second LO signal 164 to produce the RF signal 138. In one embodiment, the IF is between about 140 MHz to 160 MHz, depending on the application. Thus, where the second LO signal 164 is 762 MHz and the IF signal is 140 MHz, then the RF signal 138 is 902 MHz.

Figure 8:
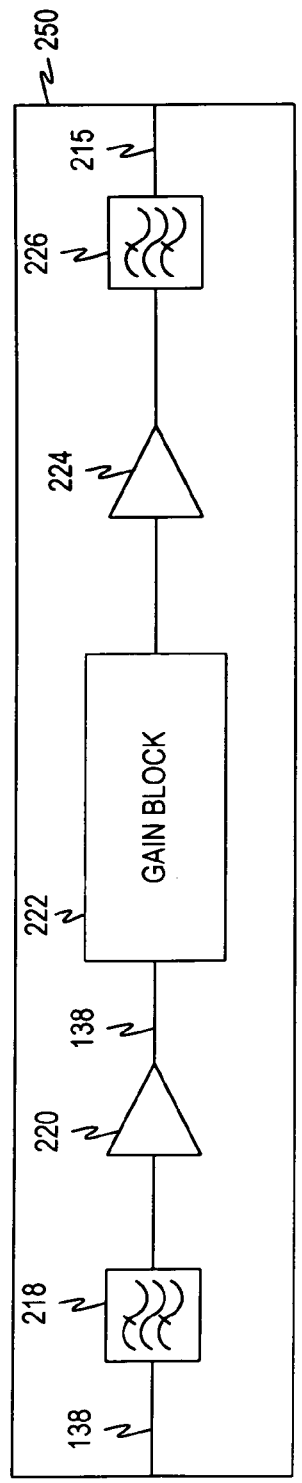
FIG. 8 is a block diagram of a secondary GPS repeater used in the GPS repeater system of FIG. 2.
Figure 9:
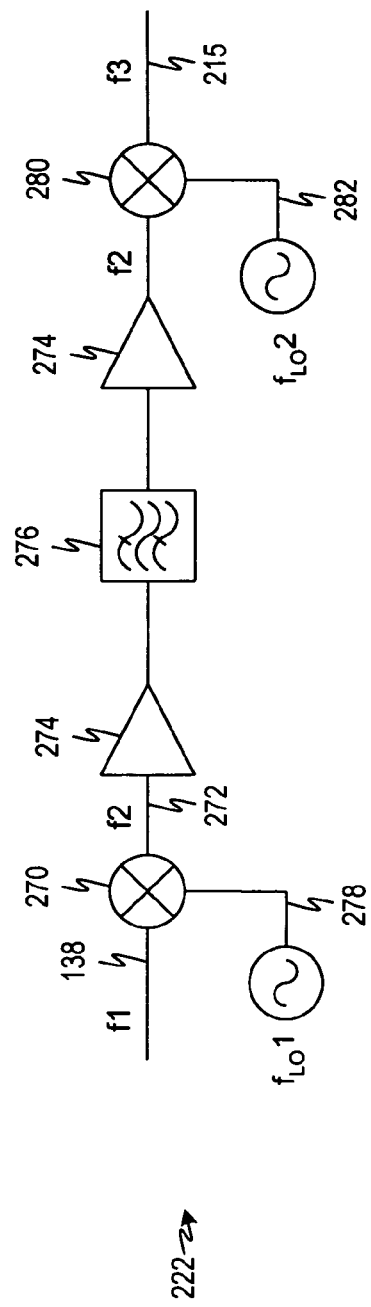
FIG. 9 is a block diagram of one embodiment of a gain block used in the secondary GPS repeater of FIG. 8.

In one embodiment, the secondary repeater 250 includes the components shown in FIG. 8. Those components include a band pass filter 218, a low noise amplifier 220, a gain block 222, a power amp 224 and second band pass filter 226. In one embodiment, the gain block 222 includes, as shown in FIG. 9, a mixer 270 for down converting the RF signal 138 to an IF signal 272. The RF signal 138 is combined by a mixer 270 with a local oscillator (LO) signal 278 to produce the IF signal 272. In one embodiment, the IF is between about 140 MHz to 160 MHz, depending on the application. Thus, where the LO signal 140 is 742 MHz and the RF signal 238 is 902 MHz, then the IF signal would be 160 MHz. The IF signal 272 is amplified by amplifiers 274 and filtered by a band pass filter 276. The band pass filter 276 significantly reduces the complex components or images of the RF signal 138 and the first LO signal 278. A second mixer 280 converts the IF signal 272 to produce the second GPS signal 215. The IF signal 272 is combined by the second mixer 280 with a second LO signal 282 to produce the second GPS signal 215. In one embodiment, the IF is between about 140 MHz to 160 MHz, depending on the application. Thus, where the second LO signal 282 is 1340 MHz and the IF signal is 160 MHz, then the second GPS signal 215 is 1.5 GHz.

In one embodiment, the amplifiers, such as amplifiers 20, 24, 28, 32, 42, 156, and 274, comprise relatively low power, linear integrated circuit chip components, such as monolithic microwave integrated circuit (MMIC) chips. These chips may comprise chips made by the Gallium Arsenide (GaAs) heterojunction transistor manufacturing process. However, silicon process chips or CMOS process chips might also be utilized.

Some examples of MMIC power amplifier chips are as follows:

1. RF Microdevices PCS linear power amplifier RF 2125P, RF 2125, RF 2126 or RF 2146, RF Micro Devices, Inc., 7625 Thorndike Road, Greensboro, N.C. 27409, or 7341-D W. Friendly Ave., Greensboro, N.C. 27410;

2. Pacific Monolithics PM 2112 single supply RF IC power amplifier, Pacific Monolithics, Inc., 1308 Moffett Park Drive, Sunnyvale, Calif.;

3. Siemens CGY191, CGY180 or CGY181, GaAs MMIC dual mode power amplifier, Siemens AG, 1301 Avenue of the Americas, New York, N.Y.;

4. Stanford Microdevices SMM-208, SMM-210 or SXT-124, Stanford Microdevices, 522 Almanor Avenue, Sunnyvale, Calif.;

5. Motorola MRFIC1817 or MRFIC1818, Motorola Inc., 505 Barton Springs Road, Austin, Tex.;

6. Hewlett Packard HPMX-3003, Hewlett Packard Inc., 933 East Campbell Road, Richardson, Tex.;

7. Anadigics AWT1922, Anadigics, 35 Technology Drive, Warren, N.J. 07059;

8. SEI Ltd. P0501913H, 1, Taya-cho, Sakae-ku, Yokohama, Japan; and

9. Celeritek CFK2062-P3, CCS1930 or CFK2162-P3, Celeritek, 3236 Scott Blvd., Santa Clara, Calif. 95054.

Thus, the GPS repeater system of the present invention fills the GPS null or "blank" areas within structures. In this way, the GPS can be used to locate individuals inside buildings, tunnels, garages, etc.

In another embodiment, the repeater system of the present invention is used in satellite transmission applications such as digital radio. Like GPS applications, digital radio signals transmitted by satellites can be obstructed from receiving antennas by structures such as buildings, car garages, tunnels, etc. Therefore, the claimed repeater is capable of retransmitting a satellite signal inside a structure such that an uninterrupted satellite signal can be transmitted to a receiver.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of retransmitting a GPS signal inside a structure, the method comprising:
receiving the GPS signal with a link antenna positioned to receive signals from outside of the structure;
with a primary repeater coupled to the link antenna, down converting the GPS signal to an intermediate frequency (IF) signal, amplifying and filtering the IF signal, and up converting the IF signal to produce a radio frequency (RF) signal;
with a broadcast antenna coupled to the primary repeater, wirelessly transceiving the RF signal with a secondary repeater configured for transceiving signals inside the structure;
at the secondary repeater, transceiving the RF signal with a link antenna;
downconverting the RF signal to a second intermediate frequency (IF) signal;
amplifying and filtering the second IF signal;
upconverting the second IF signal to a second GPS signal; and
with a broadcast antenna of the secondary repeater, transceiving the second GPS signal with GPS equipment inside the structure.

2. The method of claim 1, wherein the RF signal is a GPS signal.

3. The method of claim 1, wherein the RF signal is an unlicensed frequency signal.

4. The method of claim 1, further including filtering the GPS signal.

5. The method of claim 1, wherein the primary repeater is coupled to the broadcast antenna by a transmission line.

6. A method of retransmitting a GPS signal inside a structure, the method comprising:
receiving the GPS signal;
with a primary repeater, down converting the GPS signal to an intermediate frequency (IF) signal;
amplifying the IF signal;
up converting the IF signal to an unlicensed frequency signal;
wirelessly retransmitting the unlicensed frequency signal to a secondary repeater inside the structure;
receiving the unlicensed frequency signal;
with the secondary repeater down converting the unlicensed frequency signal to a second IF signal;
amplifying the second IF signal;
up converting the second IF signal to a second GPS signal; and
retransmitting the second GPS signal inside the structure with an antenna coupled to the secondary repeater.

7. The method of claim 6, wherein the retransmitting the unlicensed frequency signal is between a primary repeater and the link antenna of a secondary repeater.

8. A GPS repeater system for retransmitting a GPS signal inside a structure, the repeater system comprising:
a link antenna, positioned generally to receive signals from outside of the structure, for receiving the GPS signal;
a primary repeater coupled to the link antenna and including a circuit for down converting the GPS signal to an intermediate frequency (IF) signal, amplifying and filtering the IF signal, and up converting the IF signal to produce a radio frequency (RF) signal;
a broadcast antenna coupled to the primary repeater and operable for wirelessly transceiving the RF signal throughout the structure and with a secondary repeater;
a secondary repeater configured for tranceiving signals inside the structure and including a link antenna for transceiving the RF signal with the primary repeater, the secondary repeater including a circuit for downconverting the RF signal to a second intermediate frequency (IF) signal, amplifying and filtering the second IF signal and upconverting the second IF signal to a second GPS signal; and
a broadcast antenna, coupled to the secondary repeater, and operable for transceiving the second GPS signal with GPS equipment inside the structure.

9. The repeater of claim 8, wherein the RF signal is a GPS signal.

10. The repeater of claim 8, wherein the RF signal is an unlicensed frequency signal.

11. The repeater of claim 8, wherein the primary repeater circuit includes a down converter for down converting the GPS signal to an intermediate frequency (IF) signal, a first amplifier for amplifying the IF signal, a filter for filtering the IF signal, a second amplifier for amplifying the IF signal and an up converter for up converting the IF signal to produce the RF signal.

12. The repeater of claim 8, wherein the amplifier includes a filter for filtering the GPS signal.

13. A GPS repeater system for retransmitting a GPS signal inside a structure, the repeater system comprising:
 a primary repeater having a link antenna for receiving the GPS signal, a down converter for down converting the GPS signal to an intermediate frequency (IF) signal, an amplifier for amplifying the IF signal, an up converter for up converting the IF signal to an unlicensed frequency signal, and a broadcast antenna for wirelessly retransmitting the unlicensed frequency signal, inside the structure, to a secondary repeater;
 the secondary repeater having a second link antenna for receiving the unlicensed frequency signal, a second down converter for down converting the unlicensed frequency signal to a second IF signal, a second amplifier for amplifying the second IF signal, a second up converter for up converting the second IF signal to a second GPS signal, and a second broadcast antenna for wirelessly retransmitting the second GPS signal to GPS equipment inside the structure.

14. The system of claim 13, wherein the unlicensed frequency signal is about 2.4 GHz.

15. The system of claim 13, wherein the unlicensed frequency signal is about 902–928 MHz.

16. The system of claim 13, wherein the GPS signal is about 1.5 GHz.

17. The system of claim 13, wherein the IF signal is about 140–160 MHz.

18. A method of retransmitting a satellite signal inside a structure, the method comprising:
 receiving the satellite signal;
 at a primary repeater, down converting the satellite signal to an intermediate frequency (IF) signal, amplifying and filtering the IF signal, and up converting the IF signal to produce an unlicensed frequency signal;
 wirelessly retransmitting the unlicensed frequency signal inside the structure;
 receiving the unlicensed frequency signal in the structure at a secondary repeater;
 at the secondary repeater, down converting the unlicensed frequency signal to a second IF signal;
 amplifying the second IF signal;
 up converting the second IF signal to produce a second satellite signal; and
 wirelessly retransmitting the second satellite signal inside the structure.

19. The method of claim 18, wherein the satellite signal is a digital radio signal.

20. A repeater system for retransmitting a satellite signal inside a structure, the repeater system comprising:
 a primary repeater including:
 a link antenna for receiving the satellite signal;
 a circuit for down converting the satellite signal to an intermediate frequency (IF) signal, amplifying and filtering the IF signal, and up converting the IF signal to produce an unlicensed frequency signal; and
 a broadcast antenna for wirelessly retransmitting the unlicensed frequency signal inside the structure; and
 a secondary repeater configured for receiving the unlicensed frequency signal, down converting the unlicensed frequency signal to a second IF signal, amplifying and filtering the second IF signal, and up converting the second IF signal to produce a second satellite signal; and
 a broadcast antenna for wirelessly retransmitting the second satellite signal inside the structure.

21. The repeater of claim 20, wherein the satellite signal is a digital radio signal.

* * * * *